United States Patent Office 3,773,819
Patented Nov. 20, 1973

3,773,819
DISILYL-CONTAINING COMPOUNDS
Abe Berger, Schenectady, N.Y., assignor to
General Electric Company
No Drawing. Original application Aug. 16, 1971, Ser. No. 172,292. Divided and this application Aug. 2, 1972, Ser. No. 277,475
Int. Cl. C07f 7/10
U.S. Cl. 260—448.2 N          1 Claim

ABSTRACT OF THE DISCLOSURE

A novel class of silicone compounds of the formula,

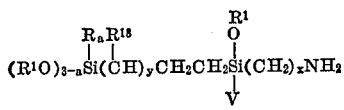

where R, $R^1$ and $R^{18}$ are hydrocarbon radicals, V is selected from monovalent hydrocarbon radicals and monovalent alkoxy and aryloxy radicals, and the symbols $y$, $x$ and $a$ are whole numbers that vary from 0 to 20, 2 to 20 and 0 to 2, respectively, and the aforesaid compounds are prepared from compounds of the formula

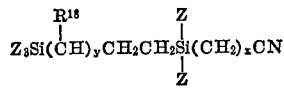

where Z is halogen. This novel class of compounds are useful as glass sizing agents, as flocculants for colloidal organic matter and as detergent resistant agents in various compositions.

BACKGROUND OF THE INVENTION

This application is a division of copending application Ser. No. 172,292, filed Aug. 16, 1971.

The present invention relates to a novel class of silicone compounds and, in particular, the present invention relates to a novel class of silicone compounds having at least two silicon atoms in the molecule.

At the present time, there has been a great deal of development and research involved in the purification of waste water streams and particularly sewage streams. In one part of such purification process of sewage streams, there is formed a colloidal suspension of the organic waste matter in the sewage stream. In the purification of this stream, it becomes necessary to flocculate and precipitate the colloidal organic matter that is suspended in the stream. Up to the present time, various types of flocculating agents have been used for this purpose, most of which have a very low efficiency in flocculating colloidal organic matter.

Compounds having activity as flocculants fall into four main classes. The classes are the colloidal hydroxides of polyvalent metal ions and water-soluble polymers of the anionic and non-ionic and cationic polyelectrolytes. It has been found that in flocculating colloidal organic matter that the cationic polyelectrolytes are more efficient than the other types of flocculating agents which fall into the other three classes indicated above. Silica sols have been used in flocculating colloidal organic matter. However, such a silica sol by itself has been shown not to have a very high efficiency in flocculating such matter. Thus, it is desirable to determine new classes of cationic polyelectrolyte compounds that will function as efficient flocculating agents of colloidal organic matter.

In addition, it is desired to find new classes of compounds which, when mixed with silica sol in the proper proportions, will result in a composition that is very efficient in flocculating colloidal organic matter.

As is known, glass types of compounds having silica molecules therein, and particular glass fibers, have been used in producing various laminates and various types of manufactured items. In particular, glass fibers are used as reinforcing agents for various materials manufactured from natural and synthetic rubbers, as well as various plastic resins. Although various types of bonding agents have been formulated for improving the bond between the other material and the glass fibers, there is constant research being carried out to find newer classes of compounds which will function as a more improved bonding agent between the rubber and the glass fibers.

At the present time, there are various types of polishes available for improving the finish on various types of items. In particular, one is familiar with automobile or car wax polishes for waxing the painted surface of an automobile. In order to improve such types of polishes, intensive development work has been carried out to add agents to the polish so that it will make the resulting polish surface resistant to the detergents usually used in cleaning the painted surface of an automobile.

Thus, constant research is being carried out to develop new classes of compounds which will act as detergent resistors and which can be added to polishes, and particularly automobile polishes, which will resist the corrosive action of the normal detergents.

It is one object of the present invention to provide a novel class of silicone compounds.

It is another object of the present invention to provide a novel process for producing a novel class of silicone compounds.

It is still another object of the present invention to provide a novel class of silicone compounds which will act as efficient flocculents for colloidal organic matter.

It is yet another object of the present invention to provide a novel class of silicone compounds which can act as efficient bonding agents for bonding various types of resins and rubbers to glass and glass fibers.

It is an additional object of the present invention to provide a novel class of silicone compounds which will act as detergent resistant agents in automobile polishes.

These and other objects of the present invention are accomplished by means of the invention defined below.

SUMMARY OF THE INVENTION

In accordance with the above objects, there is provided by the present invention a novel class of silicon compounds of the formula, (1) 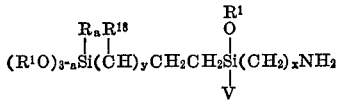

where R and $R^1$ are selected from monovalent hydrocarbon radicals and monovalent halogenated hydrocarbon radicals, $R^{18}$ is selected from the class consisting of hydrogen, alkyl radicals and aryl radicals, V is selected from the class consisting of R radicals and R'O-radicals, $y$ is a whole number that varies from 0 to 20, $x$ is a whole number that varies from 3 to 20 and $a$ varies from 0 to 2. In the above formula, preferably $a$ is equal to 0, $R^1$ is methyl and $R^{18}$ is hydrogen.

DETAILED DESCRIPTION OF THE PREFERRED EMBODIMENT

The radicals R and $R^1$ are selected from monovalent hydrocarbon radicals and halogen-substituted monovalent hydrocarbon radicals such as, for example, alkyl radicals, e.g., methyl, ethyl, propyl, butyl, octyl, etc. radicals; aryl radicals, e.g., phenyl, naphthyl, tolyl, xylyl, etc. radicals; aralkyl radicals, e.g., benzyl, phenylethyl, etc. radicals;

alkenyl radicals, e.g., vinyl, allyl, cyclohexenyl, etc. radicals; cycloalkyl radicals, e.g., cyclohexyl, cycloheptyl, etc. radicals; halogen-substituted monovalent hydrocarbon radicals such as, for example, chloromethyl, chloroethyl, dibromophenyl, etc. radicals. Preferably, the radicals R and $R^1$ are alkyl radicals of up to 10 carbon atoms, such as methyl, ethyl, propyl, etc. The radical $R^{18}$ is selected from the class consisting of hydrogen, alkyl radicals and aryl radicals of up to, preferably, 10 carbon atoms. Preferably, $R^{18}$ is an alkyl radical such as methyl, ethyl, propyl, etc.

In Formula 1 above, $a$ is a whole number that varies from 0 to 2, that is preferably 0. In the same formula, $x$ is a whole number that varies from 3 to 20 and is preferably less than 10. In addition, in Formula 1, $y$ is a whole number that varies from 0 to 20 and is preferably less than 10.

One of the more preferable compounds within the scope of Formula 1 is,

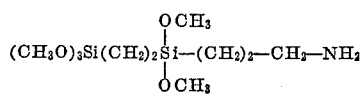

Other preferred compounds within the scope of Formula 1 are:

(1) $CH_3O\underset{\underset{CH_3}{|}}{\overset{\overset{OCH_3}{|}}{Si}}-CH_2CH_2\underset{\underset{OCH_3}{|}}{\overset{\overset{OCH_3}{|}}{Si}}-CH_2CH_2CH_2CH_2CH_3$ (2) $CH_3\underset{\underset{OCH_3}{|}}{\overset{\overset{CH_3}{|}}{Si}}-CH_2CH_2CH_2\underset{\underset{CH_3}{|}}{\overset{\overset{OCH_3}{|}}{Si}}-CH_2CH_2CH_2CH_2CH_3$ (3) $C_6H_5\underset{\underset{OC_2H_5}{|}}{\overset{\overset{OC_2H_5}{|}}{Si}}-CH_2CH_2CH_2CH_2\underset{\underset{OC_2H_5}{|}}{\overset{\overset{C_6H_5}{|}}{Si}}-CH_2-CH-CH_2NH_2$ with $C_6H_5$ (4) $C_6H_{11}\underset{\underset{O-C_3H_7}{|}}{\overset{\overset{O-C_3H_7}{|}}{Si}}-CH-CH_2-CH-CH_2\underset{\underset{C_6H_5}{|}}{\overset{\overset{O-C_3H_7}{|}}{Si}}-CH_2CH_2CH_2NH_2$ with $CH_3$ (5) $ClC_6H_4\underset{\underset{OCH_3}{|}}{\overset{\overset{OCH_3}{|}}{Si}}-CH_2CH_2CH_2\underset{\underset{OCH_3}{|}}{\overset{\overset{C_6H_4Cl}{|}}{Si}}-CH_2CH_2CH_2NH_2$ (6) $C_6H_5CH_2\underset{\underset{OC_2H_5}{|}}{\overset{\overset{OC_2H_5}{|}}{Si}}-CH_2CH_2\underset{\underset{OCH_3}{|}}{\overset{\overset{OCH_3}{|}}{Si}}-CH_2CH_2CH_2NH_2$ (7) $BrC_6H_4\underset{\underset{C_6H_4Br}{|}}{\overset{\overset{OCH_3}{|}}{Si}}-CH-CH_2CH_2\underset{\underset{OCH_3}{|}}{\overset{\overset{C_6H_5}{|}}{Si}}-CH_2CH_2CH_2CH_2NH_2$ (8) $(C_2H_5O)_3SiCH_2CH_2CH_2CH_2CH_2CH_2\underset{\underset{OC_2H_5}{|}}{\overset{\overset{OC_2H_5}{|}}{Si}}-CH_2CH_2CH_2NH_2$ (9) $CH_3O\underset{\underset{OCH_3}{|}}{\overset{\overset{OCH_3}{|}}{Si}}-CH_2CH_2\underset{\underset{OCH_3}{|}}{\overset{\overset{OCH_3}{|}}{Si}}-CH_2CH-CH_2NH_2$ with $CH_3$

(10) $C_6H_5\underset{\underset{CH_3}{|}}{\overset{\overset{OCH_3}{|}}{Si}}-CH_2CH_2\underset{\underset{C_6H_5}{|}}{\overset{\overset{CH_3}{|}}{Si}}-CH_2CH_2CH_2NH_2$

(11) $(C_6H_5O)_3Si-CH_2CH_2CH_2-\underset{\underset{CH_3}{|}}{\overset{\overset{OC_6H_5}{|}}{Si}}-CH_2CH_2CH_2NH_2$

(12) $(CH_3O)_2\underset{\underset{CH_3}{|}}{\overset{\overset{CH_3}{|}}{Si}}-CH-CH_2CH_2\underset{\underset{CH_3}{|}}{\overset{\overset{CH_3O}{|}}{Si}}-CH_2-CH-CH_2NH_2$ with $CH_3$

(13) $C_2H_5O\underset{\underset{OC_2H_5}{|}}{\overset{\overset{CH_3\ C_3H_7}{|}}{Si}}-CH-CH_2CH_2\underset{\underset{OC_2H_5}{|}}{\overset{\overset{OC_2H_5}{|}}{Si}}-CH_2CH_2CH_2NH_2$

(14) $CH_3\underset{\underset{OCH_3}{|}}{\overset{\overset{OCH_3\ CH_2C_6H_5}{|}}{Si}}-CH-CH_2CH_2-\underset{\underset{CH_3}{|}}{\overset{\overset{OCH_3}{|}}{Si}}-CH_2CH_2CH_2CH_2CH_2NH_2$

(15) $(CH_3O)_3Si\overset{\overset{C_6H_4Cl}{|}}{CH}-CH_2CH_2-\underset{\underset{CH_3}{|}}{\overset{\overset{OCH_3}{|}}{Si}}-CH_2CH_2CH_2CH_2NH_2$

(16) $CH_2=CH-\underset{\underset{OCH_3}{|}}{\overset{\overset{OCH_3}{|}}{Si}}-CH_2CH_2-\underset{\underset{OCH_3}{|}}{\overset{\overset{OCH_3}{|}}{Si}}-CH_2CH_2CH_2NH_2$

(17) $CH_2=CH-CH_2-\underset{\underset{OCH_3}{|}}{\overset{\overset{OCH_3}{|}}{Si}}-CH_2CH_2-\underset{\underset{OCH_3}{|}}{\overset{\overset{CH=CH_2}{|}}{Si}}-CH_2CH_2CH_2NH_2$

(18) $C_6H_5CH_2O-\underset{\underset{C_6H_5}{|}}{\overset{\overset{OCH_2C_6H_5}{|}}{Si}}-CH_2CH_2-\underset{\underset{OCH_3}{|}}{\overset{\overset{OCH_3}{|}}{Si}}-CH_2CH_2CH_2CH_2NH_2$ The compounds of Formula 1 are obtained by varied syntheses. Such a compound of Formula 1 is obtained by reacting a compound of the formula, (2) $NC(CH_2)_x\underset{\underset{W}{|}}{\overset{\overset{Z}{|}}{Si}}H$ with a compound of the formula, (3) $CH_2=CH(CH_2)_y\overset{\overset{R_a}{|}}{Si}Z_{(3-a)}$ in the presence of a platinum catalyst, where W is selected from R radicals and Z, the symbol Z stands for halogen, preferably chlorine, and the other symbols are as previously defined. The above reaction takes place in the presence of a platinum catalyst. The platinum compound catalyst can be selected from the group of platinum compound catalysts which are operative to catalyze the addition of silicon-hydrogen bonds across olefinic bonds. Among the many useful catalysts for this addition reaction are chloroplatinic acid as described in U.S. Pat. 2,823,218—Speier et al., the reaction product of chloroplatinic acid with either an alcohol, an ether or aldehyde as described in U.S. Pat. 3,220,972—Lamoreaux, trimethylplatinum iodide and hexamethyldiplatinum as described in U.S. Pat. 3,313,773—Lamoreaux. The platinum-olefin complex catalysts are as described in U.S. Pat. 3,159,601—Ashby and the platinum cyclopropane complex catalyst described in U.S. Pat. 3,159,662—Ashby.

The SiH-olefin addition reaction may be run at room temperature or temperatures up to 200° C., depending upon catalyst concentration. The catalyst concentration can vary from $10^{-7}$ to $10^{-3}$ and, preferably, $10^{-5}$ to $10^{-4}$ mole of platinum as metal, per mole of olefinic-containing molecules present.

The two reactants of Formulas 2 and 3 are preferably reacted in stoichiometric proportions, although excesses of either one can be used without any deleterious effects to the yield of reaction product. The reaction is conducted in a period of 2 to 12 hours and normally results in a yield of at least 70% and preferably 80% to 90%. The above reaction may be carried out in one of the usual inert hydrocarbon solvents, although such a solvent is not necessary. Examples of such solvents are ethers as tetrahydrofuran, benzene, cyclohexane, toluene and xylene, etc. The compound that is obtained in the reaction of the reactants of Formulas 2 and 3 has the formula, (4)
$$Z_2Si(CH)_yCH_2CH_2\overset{Z}{\underset{W}{Si}}(CH_2)_xCN$$
$$R^{18}$$

The compound of Formula 4, as well as the products formed therefrom, are a novel class of compounds. The compound of Formula 4 is then taken and the halogen groups substituted with alkoxy groups. This is done by reacting the compound of Formula 4 with an alcohol or an orthoformate, such as trimethylorthoformate. The generic formulas for these reactants are $R^1OH$ and $(R^1O)_3(CH)$. Where the orthoformate is used, the orthoformate is mixed in at least 1 mole of orthoformate per halogen and the resulting mixture is heated anywhere from room temperature to 120° C. and, preferably, 10° to 100° C., to remove the alkyl chloride that is formed. An HCl acceptor is not necessary in this reaction since no hydrogen chloride is formed. In the case where the alcohol is used, that is, $R^1OH$, there is carried out a normal alcoholysis reaction. In this case, the reaction is preferably carried out in the same temperature range of 70 to 100° C. under a vacuum of about 20 inches of mercury. The vacuum is applied so as to remove the hydrogen chloride that is formed so that it will not interreact with the reaction product. However, the reaction may be also carried out in the presence of an inert hydrocarbon solvent such as toluene and xylene, in which solvent the hydrogen chloride is not soluble so it is driven off and does not affect the reaction product. As an alternate, there may be present in the reaction mixture one of the normal types of hydrogen chloride acceptors or scavengers so as to take up the hydrogen chloride and thus not allow it to affect the reaction product. Such types of HCl acceptors are, for instance, trialkylamines, such as tributylamine, etc. The alcoholysis product may then be taken and hydrogenated with hydrogen gas under pressure and in the presence of a nickel catalyst to obtain the resulting amine product, that is, so as to change the nitrile group in Formula 4 to an amine group. This hydrogenation reaction is, for instance, disclosed in U.S. Pat. 2,930,809, whose disclosure is incorporated-into this patent application by reference. This reaction may be conducted at temperatures as low as 80° C. and at temperatures as high as 140° C. with good results. Temperatures below 80° C. as, for example, about 50° C. and above 140° C. can be employed. However, no advantage is obtained thereby. The preferred type of catalyst used in the present hydrogenation reaction is Raney nickel catalyst. Other catalysts that may be used are the Noble metals, such as platinum and palladium, which can be employed alone or in combination with a suitable inert support such as in combination with gamma-alumina. The reaction may be carried out in the presence of one of the inert hydrocarbon solvents which is known and which has been disclosed above, or the common alkanol solvents. The reaction can be carried out in a pressure above 500 p.s.i.g. to obtain the maximum yields of 80% and above although lower pressures of 20–60 p.s.i.g. can be used. Although lower yields will be obtained, the reaction can be carried out at pressures outside of the above range. In the reaction, it is preferable to employ the hydrogen reactant in an amount of from about 2 to about 20 chemical equivalents for equivalent of the nitrile silicone reactant. For further information as to this hydrogenation process, one is referred to the above U.S. patent mentioned previously.

One of the reactants in the main reaction disclosed above, that is the compound of Formula 2 above, is a compound well known in the art. Such a compound is obtained by reacting a compound of the formula, (5) $\quad NC(CH_2)_mCH=CH_2$ with a compound of the formula, (6)
$$H-\underset{Z_2}{\overset{W}{\underset{|}{Si}}}-Z_2$$

where Z is halogen, W is selected from R radicals and Z radicals, R and $a$ are as defined previously, and $m$ is a whole number that varies from 0 to 18. In this reaction, when the $m$ is equal to 0, a Bluestein catalyst as defined in U.S. Pat. 2,971,970 may be used to carry out the reaction. An example of such a Bluestein catalyst is a combination of tributylamine, N,N,N',N'-tetramethylethylenediamine and cuprous chloride. In place of the Bluestein catalyst, other types of basic catalysts can be used, such as triphenylphosphine, dimethylformamide, tributylamine and triethylphosphine. These basic catalysts fall in the class of free radical catalysts. Such a catalyst system is used in the reaction preferably in a concentration of 0.5 to 5% by weight of the reactants. For further details as to this reaction, one is referred to the above Bluestein patent as to more details of the reaction. As always, the reactants are reacted in stoichiometric proportions and further, an inert hydrocarbon solvent may be used in the reaction, although such a solvent is not necessary.

In the case where in Formula 5 $m$ is equal to 1 and higher than 1, then the SiH-olefin addition reaction must take place in the presence of a platinum catalyst. The type of platinum catalyst, as well as the concentration at which it is used, has been set forth above in connection with the reaction of compounds of Formulas 2 and 3. Further, the other reaction conditions are applicable. This reaction takes place as readily and a yield of anywhere from 60% to 80% is obtained from the reaction. Further, the reaction takes place in a period of time from 2 to 12 hours.

It should be mentioned that both the compounds of Formulas 5 and 6 are well known compounds in the art and the product obtained from the reaction of the two compounds has the formula, (7)
$$NC(CH_2)_mCH_2CH_2\overset{W}{\underset{|}{Si}}Z_2$$

The symbols in Formula 7 above are as previously defined. This compound may now be taken and reacted in a redistribution reaction with a compound of the formula, (8) $\quad RSiH_3$ In Formula 8 above, the R radical is the same as previously defined for Formula 1. Preferably in Formula 8, the radical R is a higher alkyl radical such as decyl, octadecyl, tetradecyl, etc. The compounds of Formulas 7 and 8 are reacted at a temperature range of from 30° C. to 150° C. for 3 to 15 hours in the presence of a tertiary amine as a catalyst. Any type of tertiary amine can be used in this reaction, such as N,N,N',N'-tetramethylethylenediamine, tributylamine, triethylamine, tripropylamine, decyldimethylamine, diethylbutylamine, etc. In this redistribution reaction, preferably the tertiary amine catalyst is used in a concentration of 1% to 3% by weight of reactants of Formulas 7 and 8. Preferably, to obtain the maximum yield in this reaction that is above 60%, there must be used 3 moles or more of the compound of Formula 7 per 1 mole of the compound of Formula 8.

Further, as is pointed out, the R radical in Formula 8 is preferably an alkyl radical and it is more preferred that it be a high carbon atom alkyl radical, such as above 10 carbon atoms, so as to facilitate the separation of the reaction product. Thus, preferably, the R radical in Formula 8 is decyl and other alkyl radicals with 10 carbon atoms or more.

The reaction product of the compounds of Formulas 7 and 8 is within the scope of the compound of Formula 2 above, which is one of the basic reactions in the present case. For more details as to the above redistribution proccess, the reader is referred to Berger U.S. Pat. 3,465,019, whose disclosure is hereby incorporated into this specification by reference.

The compound of Formula 3 above is also a compound well known in the art. In the case where y is equal to 0, the compound of Formula 3 is obtained by reacting (9)

The acetylene is reacted with a compound of Formula 9 in the presence of a platinum catalyst at the reaction time and reaction conditions indicated above for the reaction between the compounds of Formulas 2 and 3. In Formula 9, the symbol Z is a halogen as previously defined and the radical R is as previously defined. In this reaction with acetylene, it is preferred that there be used 3 to 4 moles of acetylene is excess of the stoichiometric amount needed to react with the silane of Formula 9. Insofar as the general conditions of the reaction between the acetylene and the compound of Formula 9 is concerned, the same reaction conditions are applicable in this reaction as are applicable in the reaction of the compounds of Formulas 2 and 3.

In the case where y in Formula 3 is equal to 2 or more, the compound of Formula 3 is obtained by reacting the compound of Formula 9 with a compound of the formula,

(10)
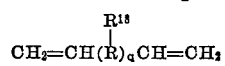

This reaction must be carried out in the presence of a platinum catalyst, which platinum catalyst and platinum type compounds are the same as defined for the reaction between the compounds of Formulas 2 and 3. In Formula 10 above, $q$ may vary from 0 to 18. The radical $R^{18}$ is the same as defined previously. In this platinum catalyzed reaction of the compound of Formula 9 with the compound of Formula 10, it is preferred to use 2 or 3 moles or more of the compound of Formula 1 in excess with the stoichiometric amount of the compound of Formula 9 so as to obtain yields in excess of 60% or 70% or more. Insofar as the reaction conditions and other conditions with respect to this reaction, the information given above with respect to the reaction of the compounds of Formulas 2 and 3 is applicable to the reaction of the compounds of Formulas 9 and 10.

In the case wherein Formula 3 y is equal to 1, there must be used a Grignard type of reaction to obtain the compound coming within the scope of Formula 3. Thus, such a compound may be obtained by reacting a compound of the formula,

(11) $CH_2=CHCHMgZ$ which is reacted with a compound of the formula,

(12)

wherein the above formula, Z is halogen and the radical R is as previously defined. This reaction takes place in the temperature range of above 10° C. and preferably 20° C. to 50° C. The reaction time at the above temperature range is from 1 to 6 hours. The reactants are preferably reacted in stoichiometric proportions, although excess of reactant of Formula 12 is preferred. In addition, one of the well known inert ether solvents may be used in this reaction. Examples of such types of ether solvents are tetrahydrofuran, diethylether, diethylene glycol dimethylether, etc.

The examples below are given for the purpose of illustrating the invention and are not intended to limit the invention in any way.

EXAMPLE 1

Preparation of cyanoethyl pentachlorodisilethane

Into a 3-necked flask equipped with a stirrer, thermometer, addition funnel and condenser in which is maintained an inert atmosphere, there is placed 72 g. cyanoethyldichlorosilane (0.5 mole) and ¼ cc. of 0.1 M chloroplatinic acid solution. The reaction mixture is heated to 100° C. whereupon there is added slowly 80.5 g. vinyltrichlorosliane (0.5 mole). An exothermic reaction occurs and the temperature rises spontaneously to 135° C. Further addition of the silane to the pot is carried out slowly to control the temperature in the range of 120° C.–140° C. Following complete addition, the reaction mixture is kept at 120° C. for 2 hours, then fractionated. The product is distilled over at 95° C.–97° C. and at 0.005 mm. of pressure. Its purity by gas chromatography is 98%. The yield is 85% and its structure is confirmed by infrared and nuclear magnetic resonance.

Into a 3-necked flask equipped with a stirrer, addition funnel, thermometer and condenser there is placed 63.1 g. of (0.2 mole) cyanoethylpentachlorodisilethane with a water-free atmosphere being maintained. There is added slowly the addition funnel 116.6 g. (1.1 moles) of trimethylorthoformate. A vigorous reaction occurred followed by gas evolution. Cooling by a water bath is utilized to keep the reaction temperature at 40° C.–50° C. After complete addition, the reaction is heated externally to 80° C.–90° C. for an additional two hours and the product fractionated. The product distilled over at 114° C./0.2 mm. Its purity is estimated by vapor phase chromatography as 99%. An infrared scan showed $CH_3$—O absorption at 3.6 and 9.25. It has a sweet odor and is shown to be free of hydrolyzable chloride by titration with NaOH solution and has the structure,

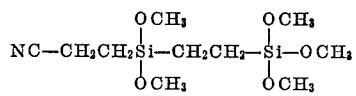

Then a 500 ml. pressure bottle is charged with 55 g. of cyanoethylpentamethoxydisilethane and 10 g. of T-1 Raney nickel catalyst. It is then placed in a Parr hydrogenator and pressured initially to 50 lbs./in.² hydrogen pressure. The temperature is then raised to 110° C. and shaking started. In the course of one hour, a total pressure drop of 23 pounds is noted. During a further reaction time of two hours, no further hydrogen pressure drop is observed. The reaction is terminated and the contents allowed to cool. The liquid product is separated from the catalyst by filtration and fractionated. The product is distilled over at 112° C./0.2 mm. There is collected 45 g. of colorless product. An infrared scan of the product shows amine peaks at 3.0μ, 3.05μ and 6.3μ. The complete absence of nitrile absorption at 4.45μ even when the sample is run in a 0.1 mm. cell is good evidence for complete reduction. The silethylene absorption at 8.8μ is also very strong. The compound is of the structure,

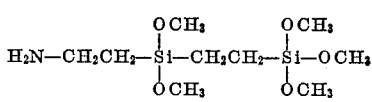

EXAMPLE 2

To cyanoethyldichlorosilane (0.5 mole) containing 4 drops of Lamoreaux platinum catalyst there is added at 100° C. (0.5 mole) allylmethyldichlorosilane. The heat given off is utilized to maintain a reaction temperature between 110° C.–130° C. Upon complete silane addition, the reaction is held at 120° C. for 2 hours and the reaction mixture fractionated to obtain 1-cyanoethyl, 1,1-dichloro-5-methyl-5,5-dichlorodisilpropane. The structure for this compound is confirmed by infrared and nuclear magnetic resonance spectroscopy. The hydrolyzable chloride agrees with the theoretical value.

The above product is treated with eight molar amounts of ethanol per mole of disilpropane which is in 100% excess at a temperature of 90° C. and a reduced pressure of 20 mm. This procedure facilitates loss of hydrogen chloride and hence avoids possible secondary reactions of the HCl with alcohol and the nitrile group of the silane.

The last traces of chloride are neutralized with ethanolic sodium ethoxide. The product is then distilled to obtain the pure 1-cyanoethyl-1,1-diethoxy-5-methyl-5,5-diethoxy-disilpropane. The above product in the amount of 100 g. is reduced with H₂ gas at 50 p.s.i. and in the presence of 15 g. of Raney nickel, in the Parr hydrogenator. When reduction is complete, the amino derivative is obtained by distillation. Its structure as

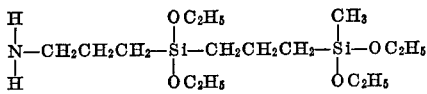

is confirmed by infrared and nuclear magnetic resonance spectroscopy.

EXAMPLE 3

Using the sequence of reactions outlined in the above Examples 1 and 2, the following sequence of reactions are carried out.

An equimolar amount of 2'-methylcyanoethyldichlorosilane is added to vinyldimethylchlorosilane containing a concentration of Pt equal to $10^{-4}$ moles per mole of vinylsilane as Lamoreaux's soluble platinum catalysts. When the reaction is completed, the halogens are replaced completely by methanol such that the halogen level as determined by hydrolyzable chloride analysis by titration with standardized alcohol, NaOH solution is less than 1 p.p.m. upon purification by fractionation. The product is reduced with H₂ gas at 40 p.s.i. using a Raney nickel catalyst at 10% level to the amine derivative. Upon filtration and distillation there is recovered the composition

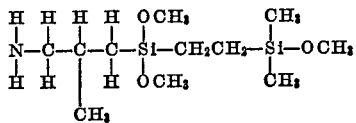

whose structure is confirmed by infrared and nuclear magnetic resonance spectroscopy.

EXAMPLE 4

Detergent resistant polish

A detergent resistant polish is made by first forming a mixture of one part of aminopropylpentamethoxydisilethane and 1.5 parts of a silanol chain-stopped polydimethylsiloxane having the formula,

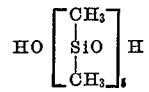

2 parts of a trimethylsilyl end-stopped polydimethylsiloxane oil having a viscosity of 10,000 centistokes at 25° C., 2 parts of a sorbitan monooleate emulsifier, 0.2 part of a polyoxyethylene sorbitan monoleate emulsifier, 20 parts mineral spirits and 15 parts kerosene. Upon thoroughly mixing the components, 50.3 parts of water is added to the mixture with high shear agitation to form an emulsion. To this emulsion there is then added 8.0 parts of aluminum silicate to produce a combination cleaner-polish emulsion. The polish formed is applied to an automobile. The polish has good rub-out and depth of gloss. The automobile is driven the term of four winter months. Throughout the period of test, the automobile is exposed to detergent washings. The film formed by the detergent resistant polish shows but slight damage at the end of the four month testing period.

What is claimed is:

1. A silicone compound of the formula,

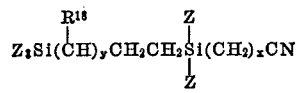

wherein Z is halogen, $R^{18}$ is selected from the class consisting of hydrogen, alkyl radicals and aryl radicals, $y$ is a whole number that varies from 0 to 20 and $x$ is a whole number that varies from 2 to 20.

References Cited

UNITED STATES PATENTS

| | | | |
|---|---|---|---|
| 3,497,539 | 2/1970 | Goossens | 260—448.2 N |
| 3,657,304 | 4/1972 | Holub et al. | 260—448.2 N |
| 3,700,716 | 10/1972 | Berger et al. | 260—448.2 N |

DANIEL E. WYMAN, Primary Examiner

R. F. SHAVER, Assistant Examiner

U.S. Cl. X.R.

260—448.2 D, 448.8 R